United States Patent [19]
Lynch

[11] Patent Number: 4,951,248
[45] Date of Patent: Aug. 21, 1990

[54] SELF CONFIGURING MEMORY SYSTEM

[75] Inventor: Todd Lynch, Sunnyvale, Calif.

[73] Assignee: Sun Microsystems, Inc., Mountain View, Calif.

[21] Appl. No.: 164,092

[22] Filed: Mar. 4, 1988

[51] Int. Cl.[5] .............................................. G06F 13/00
[52] U.S. Cl. .............................. 364/900; 364/942.51; 364/970.5
[58] Field of Search ... 364/200 MS File, 900 MS File; 365/230.03

[56] References Cited

U.S. PATENT DOCUMENTS

| | | | |
|---|---|---|---|
| 4,303,993 | 12/1981 | Panepinto, Jr. et al. | 364/200 |
| 4,609,996 | 9/1986 | Kummer | 364/900 |
| 4,727,475 | 2/1988 | Kiremidjian | 364/200 |
| 4,744,025 | 5/1988 | Lipcon et al. | 364/200 |

OTHER PUBLICATIONS

British Patent Specification No. 1,486,430, Memory System for Digital Computers, Sep. 4, 1974.
European Patent Application No. 0,226,791A2, A Memory with Means for Allocating Address Space Among Modules, Nov. 11, 1986.

Primary Examiner—Michael R. Fleming
Assistant Examiner—Debra A. Chun
Attorney, Agent, or Firm—Blakely Sokoloff Taylor & Zafman

[57] ABSTRACT

A self configuring memory for a computer system. Memory is distributed between a central processor unit (CPU) memory and expansion memory boards that are selectively insertable into expansion slots of the computer system. The CPU memory board and expansion memory boards each provide signals indicating the respective sizes of the memories. Logic circuitry on each expansion memory board determines the cumulative amount of memory in the system. This value is passed on to an adjacent expansion memory board such that the logic circuitry on each board determines the range of addresses corresponding to the physical memory space resident on the board. When an address within that range is accessed by the CPU, the logic circuitry generates an acknowledgement signal that is returned to the CPU. In an initialization routine, the CPU tests the acknowledgement signal for each address in a sequence of addresses to determine the upper limit of the addressing range available in the computer system.

9 Claims, 2 Drawing Sheets

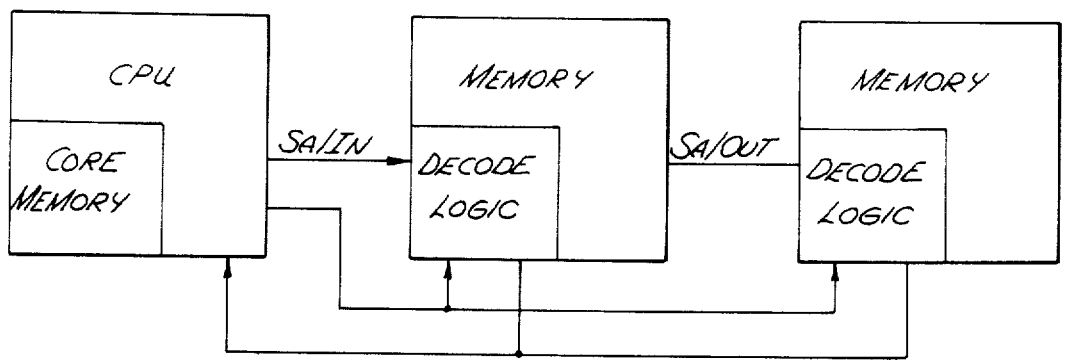

Fig. 1

| SA | DEFINITION | | |
|---|---|---|---|
| | CPU MEM | 1ST BOARD | |
| 000 | 8 MEGB | 8 MEGB | 16 MEG MEMORY IN FRONT OF 2ND BOARD |
| 001 | 8 MEGB | 16 MEGB | 24 MEG MEMORY IN FRONT OF 2ND BOARD |
| 010 | 8 MEGB | 32 MEGB | 40 MEG MEMORY IN FRONT OF 2ND BOARD |
| 011 | 8 MEGB | 64 MEGB | 72 MEG MEMORY IN FRONT OF 2ND BOARD |
| 010 | 32 MEGB | 8 MEGB | 40 MEG MEMORY IN FRONT OF 2ND BOARD |
| 100 | 32 MEGB | 16 MEGB | 48 MEG MEMORY IN FRONT OF 2ND BOARD |
| 101 | 32 MEGB | 32 MEGB | 64 MEG MEMORY IN FRONT OF 2ND BOARD |
| 110 | 32 MEGB | 64 MEGB | 96 MEG MEMORY IN FRONT OF 2ND BOARD |
| 111 | | | THIS IS THE FIRST BOARD |

Fig. 2

SELF CONFIGURING MEMORY SYSTEM

FIELD OF THE INVENTION

This invention relates to a microcomputer memory system, and more particularly to a system that is self-configuring with respect to memory size.

BACKGROUND

Modern microcomputer systems typically have provisions for expanding internal memory. For example, it is common to have "expansion slots" within the chassis of a microcomputer into which memory boards may be inserted. Such memory boards are typically a printed circuit card populated with an array of semiconductor memory chips. In order for the central processing unit (CPU) of the microcomputer to store and retrieve data in such an expandable memory, the CPU must know the total size of the memory available. Furthermore, the total memory space must be configured such that there are no addressing ambiguities.

In most microcomputer systems with expandable memories, a set of switches internal to the computer must be set to indicate the memory size whenever memory modules are inserted or removed. It is not uncommon for a technician to forget to set the switches when changing the memory size or to place such switches in the wrong positions. In either case, the CPU receives erroneous information as to the memory size and, consequently, the computer will be unable to properly address the memory. Another problem is that a customer may install a memory card, improperly set the switches and never obtain the benefits of the extra memory capacity.

In certain other systems, the CPU senses the presence of a memory module. This is typically limited to determining whether or not a predetermined memory option has been installed. Such systems are not capable of accommodating memory modules of arbitrary size that may be inserted in any one or more of several slots.

As will be subsequently described, the present invention provides a fully self configuring memory in which memory modules of various storage capacities may be inserted in any one or more of several expansion slots. Signals passed between the CPU and the memory modules inform the memory modules of their proper starting address.

SUMMARY OF THE INVENTION

The present invention provides a self configuring memory for a computer system that includes a central processing unit (CPU) and that has chassis with expansion memory slots. Memory is distributed between a memory that is physically associated with the CPU and additional memory resident on a plurality of expansion memory boards that are selectively insertable into the expansion slots in the chassis. The CPU memory and expansion memories may each have a variety of independent configurations. The CPU operates as if there is a single contiguous memory space beginning with the CPU memory and continuing through the memory space of successive expansion memory boards, if any are installed in the system.

The CPU with on board memory and expansion memory boards each provide signals indicating the respective sizes of their memories. Logic circuitry on each expansion memory board receives a signal indicating the size of the CPU memory and a signal indicating the size of the memory installed on that particular expansion memory board. The logic circuitry on each board then calculates the total memory consisting of the CPU memory, any expansion memory between the CPU memory and that expansion memory board, and the memory resident on that board. This value is then passed on to an adjacent expansion memory board in daisy chain fashion.

Logic circuitry on each expansion memory board also determines the range of addresses corresponding to the physical memory space resident on the board. When an address within that range is accessed by the CPU, the logic circuitry generates an acknowledgement signal that is returned to the CPU. The CPU can determine the total available memory space installed in the computer system by sequentially attempting to address memory locations corresponding to boundaries between increments of expansion memory. As soon as the CPU fails to receive an acknowledgement signal, thereby indicating that an address does not correspond to the physical memory space resident on any board in the system, it retains the next lower address as the upper limit of the addressing range.

BRIEF DESCRIPTIONS OF THE DRAWINGS

FIG. 1 is a block diagram of a microcomputer system incorporating the present invention.

FIG. 2 is a table defining a starting address signal utilized by memory boards of the present invention.

DETAILED DESCRIPTION OF THE PREFERRED EMBODIMENT

Figure 3:
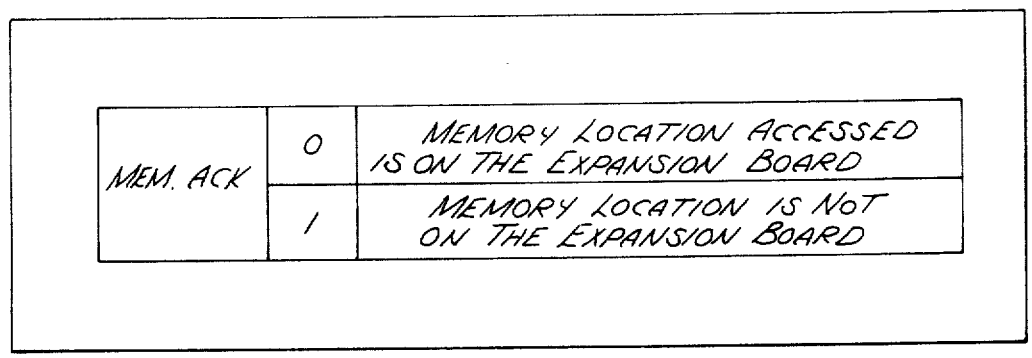
FIG. 3 is a table defining a memory acknowledge signal provided by the memory boards of the present invention.

A self-configuring memory system having particular application to microcomputer applications is disclosed. In the following description, for purposes of explanation and not limitation, specific numbers, dimensions, materials, etc. are set forth in order to provide a thorough understanding of the present invention. However, it will be apparent to one skilled in the art that the present invention may be practiced without these specific details.

FIG. 1 illustrates a microcomputer system that includes a processor 10 and memory boards 12 and 14. Although the present invention is described in terms of two expansion memory boards, it is to be understood that a computer system according to the present invention may include an arbitrarily large number of expansion memory boards by appropriately increasing the number of bits in the control signals that will be subsequently described.

Processor 10 includes a central processing unit (CPU) 16 which has an internal memory 18. CPU memory 18 is of sufficient size for many of the processing tasks of processor 10. However, certain processing tasks may require additional memory such as afforded by expansion memory boards 12 and 14. Each of memory boards 12 and 14 includes memory 20 and decode logic 22.

In the described embodiment, memory 20 comprises an array of dynamic random access memory (DRAM) chips as are well known in the art. Such an array may be either fully or half populated with chips and may use either 1 Megabit or 4 Megabit chips. Memory 20 is configured to have a storage capacity of 16 Megabytes when fully populated with 1 Megabit chips. It is apparent, then, that memory 20 will have a storage capacity of 8 Megabytes when half populated with 1 Megabit chips and will have storage capacities of 32 or 64 Megabytes when 4 Megabit chips are used.

CPU memory 18 is similar in configuration to a half populated memory 20. Thus, it has a storage capacity of 8 or 32 Megabytes depending on whether 1 or 4 Megabit chips are used.

CPU 16 operates as if there is a single contiguous memory space beginning with CPU memory 18 and continuing through the memory space of memory boards 12 and 14 if they are present. Lowest order addresses correspond to memory locations in CPU memory 18. Addresses greater than the capacity of CPU memory 18 correspond to memory locations in memory 20 of memory board 12. Addresses greater than the combined capacity of CPU memory 18 and memory board 12 correspond to memory locations in memory 20 of memory board 14. As will be subsequently described, CPU 16 determines the total amount of memory space available in the entire computer system in order to limit the range of addresses used.

Decode logic 22 on each of memory boards 12 and 14 determines the addressing range within the corresponding memory 20 based on inputs that specify the amount of memory in memory 20 and the amount of memory having lower order addresses; i.e. the amount of memory in CPU memory 18 in the case of memory board 12 and the combined amount of memory in CPU memory 18 and memory board 12 in the case of memory board 14.

Memory board 12 receives input signal SA/IN from CPU 16 on line 24. It is to be understood that although a single line 24 is illustrated in FIG. 1, it in fact comprises a plurality of parallel signal lines as is customary in the art when providing interconnections for digital information comprising a plurality of digital bits. In the described embodiment, signal SA/IN comprises three digital bits. Therefore, line 24 comprises three parallel electrical conductors. Similarly, wherever reference is made to a signal "line" throughout this disclosure, it is to be understood that such line may comprise a plurality of parallel electrical conductors, the number of which is determined by the number of bits transmitted on such line.

Signal SA/IN provides memory board 12 with a signal representing the amount of memory having lower order addresses. As illustrated in FIG. 1, memory board 12 is adjacent to processor 10. Therefore, the only such memory is CPU memory 18. As explained above, CPU memory 18 may have a capacity of either 8 Megabytes or 32 Megabytes. Regardless of the size of CPU memory 18, however, CPU 16 provides an output on line 24 such that all bits of SA/IN are a logical one. This condition of SA/IN indicates to decode logic 22 of memory board 12 that it is the board whose memory addresses follow those of CPU memory 18.

CPU 16 also provides output CPU SIZE on line 28. This output is used to indicate to the expansion memory boards the quantity of memory in CPU memory 18. As mentioned above, CPU memory 18 of the described embodiment may be either 8 or 32 Megabytes. Thus, signal CPU SIZE need comprise only a single bit to represent the two possible configurations of core memory 18. Using well known techniques of logic circuit design, decode logic 22 of memory board 12 combines the information provided by input signals SA/IN and CPU SIZE to determine the address of the first memory location in memory 20 of memory board 12.

Figure 4:
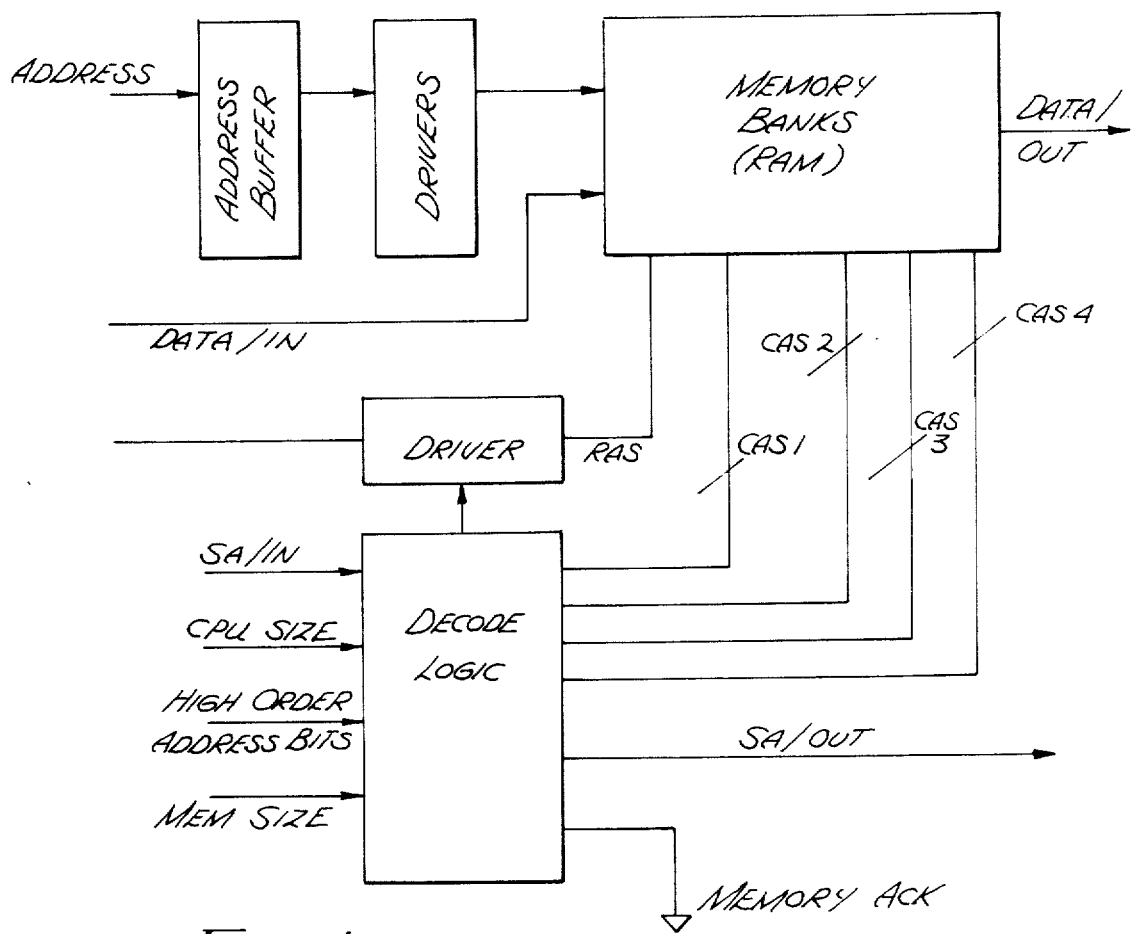
FIG. 4 is a block diagram of a memory board of the present invention.

As shown in FIG. 4, decode logic 22 also receives input MEM SIZE which indicates the capacity of memory 20. As explained above, memory 20 may comprise any of 8, 16, 32 or 64 Megabytes. Thus signal MEM SIZE need comprise only two bits to represent the four possible configurations of memory 20. The size of memory 20 is, of course, known at the time of manufacture of the memory board. During manufacture of the memory board, jumpers are installed to provide the appropriate two bit code for the MEM SIZE input to decode logic 22. Knowing the address of the first memory location in memory 20 as previously explained and knowing the amount of memory on its own board, decode logic 22 of memory board 12 determines the appropriate start address code for adjacent expansion memory board 14. This code is provided by signal SA/OUT on line 26.

For purposes of illustration, FIG. 2 presents in tabular form each of the possible digital words associated with signal SA/OUT of a first memory board (i.e. board 12) in an embodiment that can accommodate up to two expansion memory boards. As previously discussed, CPU memory 18 of the described embodiment may have either of two different sizes. Let the size of CPU memory 18 be represented by X. As also discussed, memory 20 of memory board 12 may have any one of four different sizes. Let the size of memory 20 of memory board 12 be represented by $Y_1$. Therefore, there are eight possible combinations of memory sizes $X + Y_1$ in front of (i.e. having lower order addresses than) memory board 14. For example, if decode logic 22 of memory board 12 receives a CPU SIZE input indicating that CPU memory 18 is 8 Megabytes and receives a MEM SIZE input indicating that memory 20 of board 12 is 8 Megabytes, then all three bits of signal SA/OUT of board 12 are set to a logic zero. Decode logic 22 of memory board 14 is thus informed that there is a total memory capacity, $X + Y_1$, of 16 Megabytes in front of it.

Decode logic 22 of expansion memory board 14 receives signal SA/OUT from decode logic 22 of memory board 12 as input SA/IN on line 26. In a manner similar to that described above in connection with memory board 12, decode logic 22 of memory board 14 combines input SA/IN with signal MEM SIZE indicating the size of memory 20 installed in memory board 14. Let this latter value be represented by $Y_2$. Decode logic 22 of memory board 14 thus derives the range of addresses corresponding to address space $Y_2$. Decode logic 22 of memory board 14 also derives the quantity $X + Y_1 + Y_2$ representing the total memory available in CPU memory 18 and in memory boards 12 and 14. In an embodiment comprising more than two expansion memory slots, a digitally coded representation of this value is provided to an adjacent expansion memory board (not shown).

It should be noted that if memory board 12 were not installed in the system, line 26 would be an open circuit. To provide for this eventuality, decode logic 22 includes pull up resistors 40 on all bits of the SA/IN input. Pull up resistors 40 insure that all bits of input SA/IN will appear as a logic 1 if the line providing the input, such as line 26 of FIG. 1, is an open circuit. In this event, as shown in FIG. 2, decode logic 22 of memory board 14 will be informed that the only memory in front of it is CPU memory 18. In this manner, a memory board may be inserted into any available slot rather than being constrained to the slot physically adjacent processor 10. However, in a system having more than two available slots, if more than one expansion memory board is used, such boards must be placed in contiguous slots. Otherwise, if there are empty slots between the boards, any board having an empty slot in front of it will appear to be the first memory board.

As described thus far, decode logic 22 of each expansion memory board is able to determine the range of addresses that correspond to the physical memory space resident on that board. As shown in FIG. 4, decode logic 22 also receives as an input on line 42 the most significant address bits whenever CPU 16 accesses a memory location. It will be recognized that since the smallest increment of expansion memory in the described embodiment is 8 Megabytes ($2^{23}$ bytes), the 23 least significant address bits are irrelevant in determining which increment of expansion memory is being addressed. Thus, only the most significant address bits are required as an input to decode logic 22. However, some of the 23 least significant address bits may also be provided to decode logic 22 in order to specify a memory sub-array as will be subsequently described.

Whenever the address bits on input 42 correspond to an address within the range of addresses in memory 20, decode logic 22 sets output MEM ACK on line 44 to a logical zero, otherwise MEM ACK is set to a logical one. A truth table for output signal MEM ACK is shown in FIG. 3. It should be noted that the described polarity of signal MEM ACK is for convenience only, and that the reverse polarity may be employed as a design choice by on skilled in the art.

The MEM ACK outputs of each expansion memory board are connected to input line 30 to CPU 16. An output circuit (not shown) in decode logic 22 for output signal MEM ACK is configured, as is well known in the art, such that if any one output line 44 is set to a logical zero then line 30 will also represent a logical zero, whereas line 30 will represent a logical one only if all output lines 40 are set to a logical one. Thus, whenever CPU 16 accesses a memory location that is within the physical address space of any one of the expansion memory boards, line 30 will be received as a logical zero.

In order to determine the total memory space available and thus the maximum range of addresses available, CPU 16 executes an initialization routine. In such routine, CPU 16 attempts to address memory boundaries corresponding to the increments of expansion memory, namely 8 Megabytes in the described embodiment. As each boundary address is generated, signal MEM ACK is tested. If MEM ACK is a logical zero, the next boundary address is generated. When MEM ACK is determined to be a logical one, CPU 16 recognizes that the address generated exceeds the memory space available and thereupon stores the value of the maximum address range. It is well within the capabilities of a computer programmer of ordinary skill to write a computer program to perform the steps just described.

As described above, CPU 16 is able to determine the amount of available memory whether one, both or neither of expansion memory boards 12 and 14 are installed. Furthermore, CPU 16 is able to determine the amount of available memory for any combination of configurations of CPU memory 18 and memories 20.

Storage and retrieval of data in memory 20 is accomplished in an essentially conventional manner. As seen in FIG. 4, memory 20 receives data from processor 10 and provides data to processor 10 on data bus 56. A memory address is received by address buffer 46 from processor 10 on line 48. The address is then applied to line drivers 50 which in turn apply the address to memory 20. Processor 10 provides row address strobe (RAS) and column address strobe (CAS) signals on lines 52 and 54 respectively. The use of such signals to control memory access is well known in the art. The RAS signal is applied directly to memory 20, however, the CAS signal is applied to decode logic 22. In the embodiment described herein, memory 20 is partitioned into four sub-arrays of memory. As described above, decode logic 22 processes certain of the most significant address bits to generate output MEM ACK. If decode logic 22 determines that the address corresponds to the physical memory space resident in memory 20, it applies one of signals CAS1, CAS2, CAS3, or CAS4 to memory 20 in synchronism with the receipt of the CAS signal on line 54. Decode logic 22 generates the appropriate CAS signal based on which of the four sub-arrays is being addressed.

It will be recognized that the above described invention may be embodied in other specific forms without departing from the spirit or essential characteristics of the disclosure. Thus, it is understood that the invention is not to be limited by the foregoing illustrative details except as set forth in the appended claims.

I claim:

1. In a computer system wherein data are represented by digital bytes, each of said digital bytes comprising a plurality of digital bits, and wherein said data are stored in a contiguous ordered memory space having sequentially addressable locations for storage of said digital bytes, said computer system including a central processing unit (CPU) and a chassis having a plurality of receptacles for receipt of digital circuit modules, a self configuring expandable memory comprising:

a CPU memory proximately coupled to the CPU for storing a predetermined number X of digital bytes;

a first signal line coupled to each of said plurality of receptacles and coupled to said CPU, said CPU including first output means for providing a digital signal on said first signal line representing the value of X;

a second signal line coupled between adjacent pairs of said plurality of receptacles for relaying memory size data from an output of a receptacle to an input of a next receptacle;

pull-up resistor means coupled to said second signal line at each of said plurality of receptacles for applying a predetermined signal value to said second signal line in the absence of memory size data thereon;

at least one expansion memory board selectively insertable in any one of said plurality of receptacles comprising:

a memory for storing a predetermined number Y of digital bytes;

first and second input means for receiving digital signals coupled to said first and second signal lines, respectively, upon insertion of said expansion memory board in said one receptacle;

means for providing a digital signal representing the value of Y;

decode logic means for combining the value of X with the value of Y if said predetermined value is received on said second signal line and otherwise combining the value of Y with said relayed memory size data;

output means for applying an output signal to said second signal line representing the combined value determined by said decode logic means;

whereby said output signal represents the total memory size of said CPU memory, said at least one expansion memory board and all intervening expansion memory boards.

2. The self configuring expandable memory of claim 1 wherein said decode logic means includes means for computing a range of addresses corresponding to said predetermined number Y of digital bytes.

3. The self configuring expandable memory of claim 2 wherein said at least one expansion memory board further comprises third input means for receiving an address of a memory location to be accessed by the CPU and means for generating an acknowledgment signal to indicate when said location to be accessed by the CPU is within said range of addresses corresponding to Y.

4. The self configuring memory of claim 3 wherein the CPU includes means for determining a total memory space in the computer system comprising:
means for sending an ordered sequence of addresses to said third input means;
means for receiving said acknowledgment signal;
whereby said total memory space is determined by a last address of said ordered sequence for which an acknowledgment signal is received.

5. In a computer system wherein data are represented by digital bytes, each of said digital bytes comprising a plurality of digital bits, and wherein said data are stored in a contiguous ordered memory space having sequentially addressable locations for storage of said digital bytes, said computer system including a central processing unit (CPU) and a chassis having at least two receptacles for receipt of digital circuit modules, a self configuring expandable memory comprising:
a CPU memory proximately coupled to the CPU for storing a predetermined number X of digital bytes;
a first signal line coupled to each of said receptacles and coupled to said CPU, said CPU including first output means for providing a digital signal on said first signal line representing the value of X;
a second signal line coupled between an output of a first receptacle and an input of a second receptacle for relaying memory size data;
a first expansion memory board selectively insertable in said first receptacle comprising:
a first memory for storing a predetermined number $Y_1$ of digital bytes;
first input means coupled to said first signal line upon insertion of said expansion memory board in said first receptacle for receiving said digital signal representing the value of X;
means for providing a digital signal representing the value of $Y_1$;
first decode logic means for combining the value of X with the value of $Y_1$;
output means for applying an output signal to said second signal line representing the combined value $X+Y_1$;
a second expansion memory board selectively insertable in said second receptacle comprising:
a second memory for storing a predetermined number $Y_2$ of digital bytes;
second input means coupled to said second signal line upon insertion of said second expansion memory board in said second receptacle for receiving said output signal representing $X+Y_1$, from said first expansion memory board;
means for providing a digital signal representing the value of $Y_2$;
second decode logic means for combining the value of $Y_2$ with the value of $X+Y_1$;
whereby said combined value $X+Y_1+Y_2$ represents the total memory size of the computer system.

6. The self configuring expandable memory of claim 5 wherein said first and second decode logic means include means for computing a range of addresses corresponding to said predetermined number of digital bytes $Y_1$ and $Y_2$, respectively.

7. The self configuring expandable memory of claim 6 wherein each of said first and second expansion memory boards further comprises third input means for receiving an address of a memory location to be accessed by the CPU and means for generating an acknowledgment signal to indicate when said location to be accessed by the CPU is within said range of addresses corresponding to $Y_1$ and $Y_2$, respectively.

8. The self configuring memory of claim 7 wherein the CPU includes means for determining a total memory space in the computer system comprising:
means for sending an ordered sequence of addresses to said third input means;
means for receiving said acknowledgment signal;
whereby said total memory space is determined by a last address of said ordered sequence for which an acknowledgment signal is received.

9. In a computer system wherein data are represented by digital bytes, each of said digital bytes comprising a plurality of digital bits and said data are stored in a contiguous ordered memory space having sequentially addressable locations for storage of said digital bytes, said computer system including:
a central processing unit (CPU);
a CPU memory for storing a predetermined number X of digital bytes;
a chassis having a plurality of receptacles for receipt of digital circuit modules;
a first signal line coupled to each of said plurality of receptacles and coupled to said CPU, said CPU including first output means for providing a digital signal on said first signal line representing the value of X;
a second signal line coupled between adjacent pairs of said plurality of receptacles for relaying memory size data from an output of one receptacle to an input of a next receptacle;
pull-up resistor means coupled to said second signal line at each of said plurality of receptacles for applying a predetermined signal value to said second signal line in the absence of memory size data thereon;
at least one expansion memory board selectively insertable in any of the receptacles, said at least one expansion memory board having a memory for storing a predetermined number Y of digital bytes;
a method for determining a total memory space in the computer system comprising the steps of:
(a) generating in said CPU a first digital signal representing the value of X;
(b) receiving said first digital signal in said at least one expansion memory board;

(c) generating a digital signal internal to said at least one expansion memory board representing the value of Y;

(d) computing a cumulative memory size in said at least one expansion memory board representing the combined value of X+Y if said predetermined value is received on said second signal line and otherwise representing the combined value of X and said relayed memory size data;

(e) computing in said at least one expansion memory board a range of addresses corresponding to said predetermined number Y of digital bytes;

(f) sending an ordered sequence of addresses from said CPU to said at least one expansion memory board;

(g) generating in said at least one expansion memory board an acknowledgment signal for each address of said ordered sequence of addresses that is within said range of addresses corresponding to Y;

(h) receiving said acknowledgment signal in said CPU;

whereby said total memory space is determined by a last address of said ordered sequence for which said acknowledgment signal is received.

* * * * *

UNITED STATES PATENT AND TRADEMARK OFFICE
Certificate

Patent No. 4,951,248                                              Patented: Aug. 21, 1990

On petition requesting issuance of a certificate for correction of inventorship pursuant to 35 U.S.C. 256, it has been found that the above-identified patent, through error and without any deceptive intent, improperly sets forth the inventorship.

Accordingly, it is hereby certified that the correct inventorship of this patent is: Todd Lynch, Charles E. Narad.

Signed and Sealed this Twenty-Eighth Day of May, 1991.

MICHAEL R. FLEMING

*SPE Art Unit 238*